L. J. AKINS.
GUANO DISTRIBUTER.
APPLICATION FILED MAY 3, 1910.
977,773.
Patented Dec. 6, 1910.
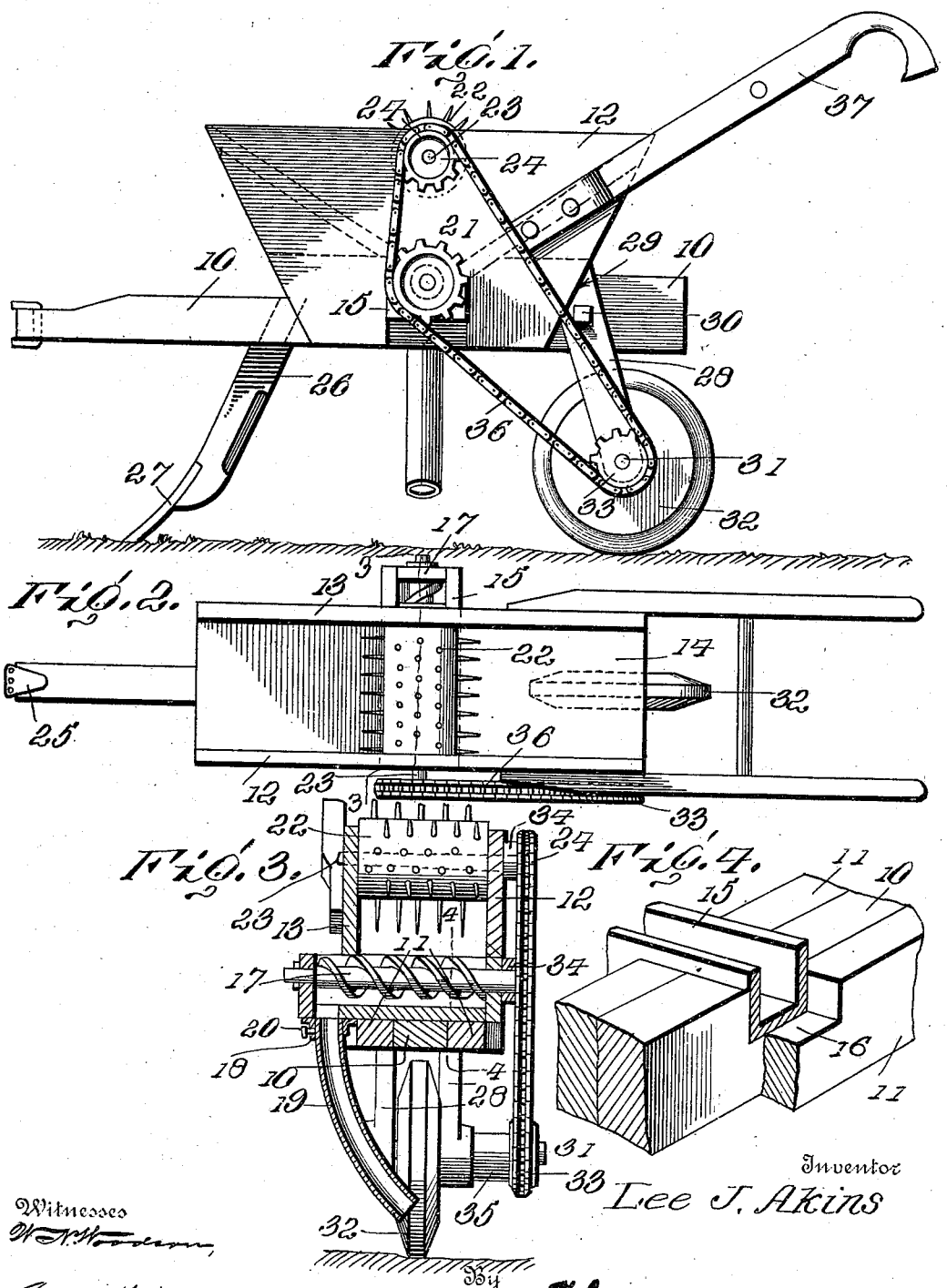
Inventor
Lee J. Akins

UNITED STATES PATENT OFFICE.

LEE J. AKINS, OF BECKVILLE, TEXAS.

GUANO-DISTRIBUTER.

977,773. Specification of Letters Patent. Patented Dec. 6, 1910.

Application filed May 3, 1910. Serial No. 559,138.

*To all whom it may concern:*

Be it known that I, LEE J. AKINS, a citizen of the United States, residing at Beckville, in the county of Panola and State of Texas, have invented certain new and useful Improvements in Guano-Distributers, of which the following is a specification.

This invention relates to fertilizer distributers and has particular reference to an improved distributer constructed especially for use in distributing guano.

An object of this invention is to construct a device of this nature wherein the hopper may be filled without the disadvantage of having the fertilizer falling from the bottom of the hopper during such filling, and wherein the fertilizer is fed from the hopper by a screw or worm conveyer to the feed spout.

For a full understanding of the invention, reference is to be had to the following description and accompanying drawing, in which:

Figure 1 is a side elevation of the improved distributer. Fig. 2 is a top plan view of the same. Fig. 3 is a central transverse section on the line 3—3 of Fig. 2 through the distributer, and Fig. 4 is a detail sectional perspective view of the bottom of the hopper and the feed trough positioned therein taken on the line 4—4 of Fig. 3.

Corresponding and like parts are referred to in the following description and indicated in all the views of the accompanying drawing by the same reference characters.

Referring to the drawing the numeral 10 designates a longitudinal beam which is provided against its opposite sides with filling blocks 11. The filling blocks 11 are positioned against the beam midway of its ends. The upper edges of the filling blocks and the beam are flush so as to provide a flat and broad surface. The blocks 11 carry against their outer faces the sides 12 and 13 of the hopper of the distributer. The sides 12 and 13 have downwardly beveled opposite ends and carry therebeneath the inclined end-walls 14. The lower ends of the walls 14 are spaced apart to receive a transverse feed trough 15 therebetween. The beam 10 and blocks 11 are recessed as at 16 to accommodate the feed trough 15. The sides 12 and 13 are likewise recessed, but in their lower edges, to receive the feed trough 15 and to hold the same from upward movement. The feed trough 15 is thus held within the sides 12 and 13 by the beam 10 and blocks 11 which are interposed between the lower ends of the sides 12 and 13. The opposite ends of the feed trough 15 are closed and support a worm conveyer 17 for rotating longitudinally therein. One end of the trough 15 extends beyond the wall 13 and carries a cylindrical socket 18 against its under side to adjustably receive a depending and curved spout 19. The socket 18 carries a set screw 20 engaging against the side of the spout 19 to clamp the same in various angles within the socket. The worm conveyer 17 projects through the wall 12 and carries a sprocket wheel 21 upon its outer end by means of which the conveyer is operated. A toothed cylinder 22 is transversely disposed between the sides 12 and 13, midway of their ends and adjacent the outer ends thereof, to feed the fertilizer over the inclined end walls 14 to the feed trough 15. The cylinder 22 is mounted upon a suitable shaft 23, which projects beyond the side 12 and carries a suitable sprocket wheel 24.

The forward end of the beam 10 carries a clevis 25, or a like device for drawing the distributer, and is further provided with a depending standard 26 upon the lower end of which a shovel plow 27, or the like, is positioned. The beam 10 extends a slight distance rearwardly of the hopper, and carries a pair of depending companion bars 28 having upper beveled ends as at 29 to seat snugly against the rear extremities of the filling blocks 11, and are held in such position by means of a transverse bolt 30. The bolt 30 passes through the upper ends of the companion bar 28 and the rear extremity of the beam 10. The lower ends of the companion bars 28 carry a transverse shaft 31, upon which is keyed a traction wheel 32. One end of the shaft 31 extends beyond the companion bar 28 and carries a sprocket wheel 33 upon its outer end in alinement with the sprocket wheels 21 and 24. The worm conveyer 17 and the transverse shaft 23 are provided with spacing collars 34 to hold the sprockets 21 and 24 in spaced relation from the side 12. The shaft 31 carries a spacing collar 35 to hold the sprocket 33 outwardly from the companion bar 28 and in registration with the upper sprocket. A chain 36 is passed over the three sprockets and is employed to rotate the cylinder 22 and the worm conveyer 17.

During the operation of the device the worm conveyer is revolved and carries the fertilizer through the feed trough 15 from the bottom of the hopper and deposits the same in the spout 19. The spout 19 is so adjusted within the socket 18 that the lower end of the spout terminates immediately behind the shovel 27. The fertilizer is thus deposited in the furrow behind the shovel 27. It is readily observed that the spout 19 can be adjusted within the socket 18 in any desired angle, by means of the set screw 20 in order to deposit the fertilizer at the side of the furrow.

The distributer is provided with a pair of rearwardly extending handles 37, which are preferably secured against the sides 12 and 13 and extend upwardly therefrom.

The mixing cylinder 22 is designed to break up the fertilizer, if it is damp and has a tendency to lump, and to cause the falling of the same into the feed trough 15 and the pockets formed between the adjacent edges of the spiral blade of the feed screw 17. This action insures the regular feeding of the fertilizer whether the same is damp or dry, especially since the spiral groove in the feeder 17 at all times discharges a predetermined amount of the fertilizer into the spout 19.

The rate of feeding the fertilizer to the spout 19 depends upon the ratio between the sprockets 33 and 21, the sprockets being of any desired size to effect the turning of the conveyer 17 at the required speed.

Having thus described the invention, what is claimed as new is:—

A fertilizer distributer including a beam, filling blocks carried against the sides of the beam, a hopper mounted over the filling blocks and the beam, said beam and said filling blocks having their upper edges flush to provide a flat bottom for the hopper, a transverse trough seated across the beam and the filling blocks and projecting from one side of the hopper, a spout depending from the trough, a cylinder in the hopper, a worm conveyer in the trough, and rotating means carried by the beam for actuating the conveyer and the cylinder.

In testimony whereof, I affix my signature in presence of two witnesses.

LEE J. AKINS.

Witnesses:
P. R. NISBETT,
J. W. SHARP.